May 17, 1966  C. P. AFANADOR ETAL  3,251,436
SPOT-TYPE DISK BRAKE
Filed March 16, 1965  2 Sheets-Sheet 1
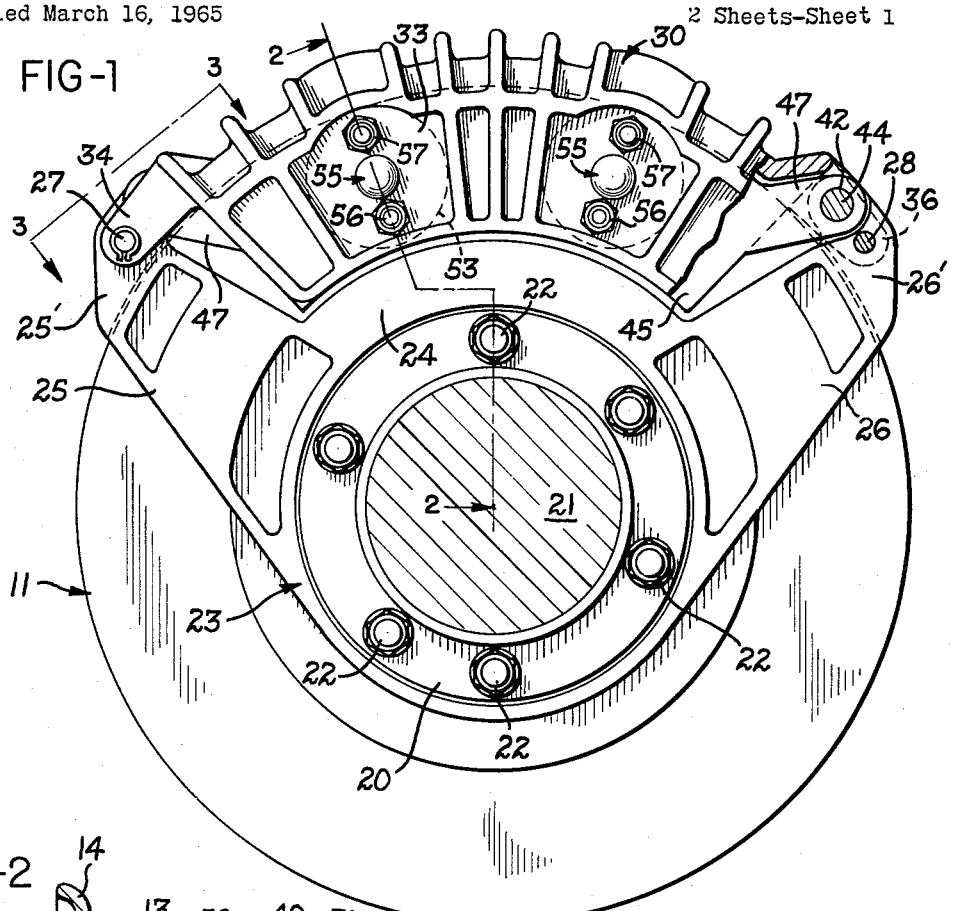
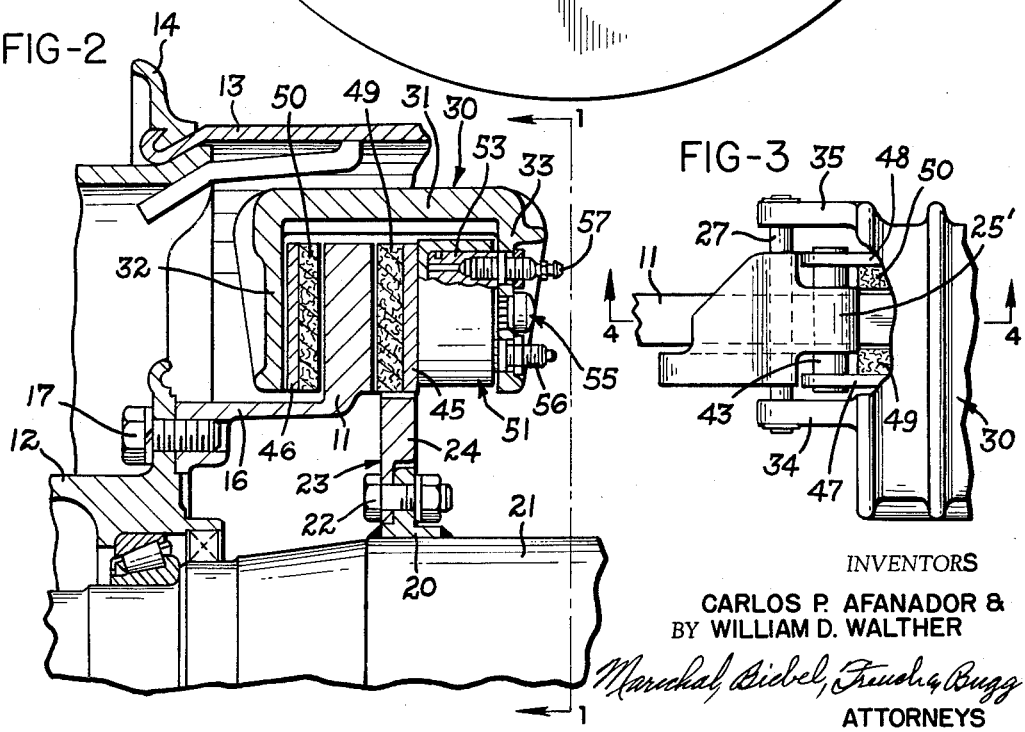
INVENTORS
CARLOS P. AFANADOR &
BY WILLIAM D. WALTHER
ATTORNEYS

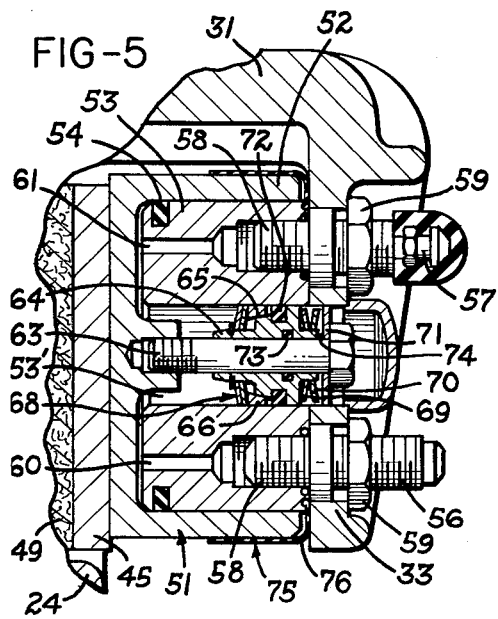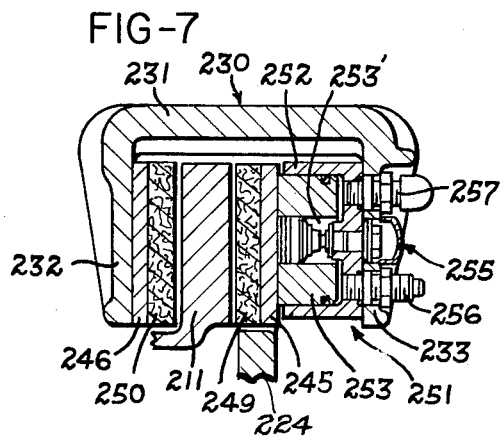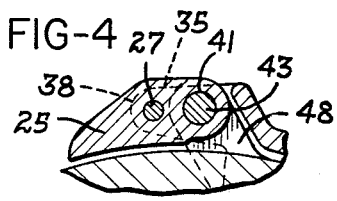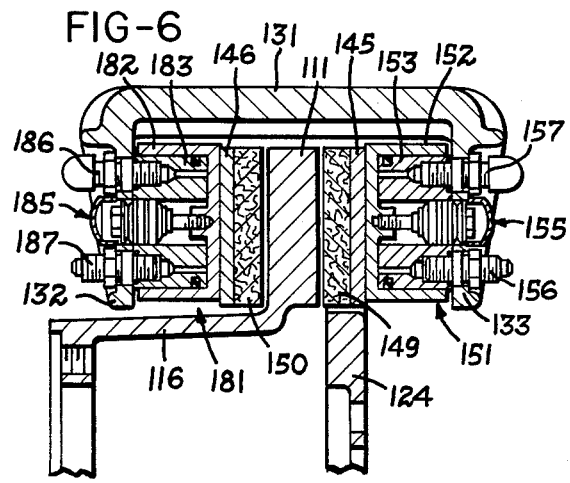

United States Patent Office 3,251,436
Patented May 17, 1966

3,251,436
SPOT-TYPE DISK BRAKE
Carlos P. Afanador, Centerville, and William D. Walther, Dayton, Ohio, assignors to The Dayton Steel Foundry Company, Dayton, Ohio, a corporation of Ohio
Filed Mar. 16, 1965, Ser. No. 466,492
5 Claims. (Cl. 188—73)

This application is a continuation-in-part of copending application, Serial No. 250,524, filed January 10, 1963, and now abandoned.

The invention disclosed in this application relates to brakes. The specific embodiments disclosed are hydraulic disk brakes of the caliper type.

Heretofore caliper type disk brakes have been provided in which one or both of the caliper arms are formed with a cylinder bore which forms at least a portion of the fluid brake cylinder unit. In the embodiment disclosed herein, we have eliminated the necessity of forming such a cylinder bore in either of the caliper arms and the consequent necessity of such accurate machine operations on the caliper housing.

One of the objects of our invention therefore is the provision of a new and improved fluid disk brake.

A further object of our invention is the provision of a new improved fluid disk brake of the caliper type.

A further object of this invention is the provision of a caliper disk brake in which there is mounted one or more separate and integral fluid force applying assemblies on an inside surface of one of the arms or skirts of the caliper housing and formed separately from the housing and from the brake plates and also preferably free of direct attachment with or to such plates.

Another important object of this invention is the provision in a caliper type disk brake of a torque member which extends in separate portions or arms to positions radially opposite the periphery of the disk and which carry one or more transversely oriented rods or pins for the support of the brake plates and the caliper housing. In the preferred embodiment, the pins are supported on the torque member at positions intermediate the ends thereof leaving the ends unsupported for the mounting of the caliper housing or the brake plates or both thereon.

A still further object of the invention is the provision of a torque member in a caliper type disk brake in which the torque member extends alongside the disk in separate portions to arcuately spaced portions opposite the disk periphery and which rigidly support rods or pins intermediate the ends thereof and centrally of the disk so that the pins extend generally axially to positions on either side of the central support to receive brake plates thereon. Preferably, the torque portion may also serve to limit the extent of movement of the brake plates following wear of the lining to prevent rubbing or contact of the plates with the disk.

Another object of the invention is the provision of a brake as outlined above in which the torque portions each support the pins, one provided for the mounting of the caliper housing and the other for the mounting of the backing plates.

Further objects and features of the invention include the securing of one fluid force applying unit to an inside surface of the caliper housing and positioned to exert a braking force directly against the adjacent backing plate of a brake pad.

Another object of the invention is the provision of a disk brake as outlined above in which the fluid fittings exclusively secure an integral and separate force applying assembly to an inside surface of the caliper housing.

A further object of our invention is the formation of a fluid piston unit and a fluid cylinder unit formed entirely separate from the caliper arms or skirts and mounting the two units wholly in the space between the arms or skirts.

Further objects and advantages and features of our invention will be apparent from the following description and claims and the accompanying drawings illustrating several embodiments of our invention.

In the drawings:

FIG. 1 is a view mainly in elevation but partly in section looking generally along the line 1—1 in FIG. 2 and showing a brake disk and a cooperating caliper type brake for the disk, the brake being carried on a torque member mounted on the axle of the vehicle;

FIG. 2 is a fragmentary view mainly in section of the structure of FIG. 1, taken as if on the line 2—2 of FIG. 1;

FIG. 3 is a fragmentary view in plan of a portion of the structure taken as if upon the line 3—3 of FIG. 1;

FIG. 4 is a view substantially in vertical section of a fragment of the structure of FIG. 1 taken substantially on the line 4—4 of FIG. 3;

FIG. 5 is a view mainly in vertical section of a fragmentary portion of the structure shown in FIG. 2 but shown in FIG. 5 on a larger scale and having additional parts broken away and sectioned so as to show more clearly the automatic retracting mechanism;

FIG. 6 is a view mainly in vertical section of a fragment of an alternative form of our invention utilizing two brake applying cylinders, the view corresponding substantially to a portion of the showing of FIG. 2; and FIG. 7 is a similar fragmentary view mainly in vertical section of another embodiment having a modified form of mounting for the hydraulic force applying assembly.

Detailed description

Referring still to the drawings for more detailed descriptions of the embodiments of our invention shown in illustration thereof, it may be seen that we have shown in FIG. 1 an axially offset brake disk 11, which is secured to a vehicle wheel, portions of which are shown in FIG. 2 wherein there is indicated a hub 12 and rim portions 13 and 14. The disk 11 is secured to the hub portion 12 through an annular or cylindrical flange member 16 by bolts 17.

An annular flange 20 is welded to or otherwise forms a part of a fixed axle 21. Fixedly mounted on the flange 20 by bolts 22 is a brake support torque member 23 formed with a mounting ring 24 and a pair of spaced, generally radially outwardly extending support arms 25 and 26. The arms 25 and 26 are positioned adjacent one side of the disk 11 and each have outer, axially-turned ends which form integral, axially-extending support portions 25' and 26', such as the portion 25' shown in plan view in FIG. 3. The portions 25' and 26' extend both axially and arcuately inwardly a short distance from the ends of their respective arms 25 and 26 so that they are axially centered outwardly of the periphery of the disk 11, and are arcuately spaced from each other.

Combined caliper guide and support means for the caliper housing includes a pair of rods 27 and 28 which are, respectively, journaled in the portions 25' and 26', with the rod 27 being shown in plan view in FIG. 3. The rods 27 and 28 are each supported by their respective arms 25 and 26 at a single location radially centrally of the disk and outwardly of the disk periphery with the opposite ends of each of the rods 27 and 28 being unsupported, and with the longitudinal axis of the rods being substantially parallel to the axis of the wheel. Accordingly, these rods are centrally supported and extend generally equally from the portions 25' and 26' to positions on either side of the disk 11.

The rods 27 and 28 and the torque member 23 provide the means for movably supporting a caliper housing 30 including a fluid force applying means and for confining the movement of the housing to straight line translatory movement generally parallel to the axis of the disk, without rocking movement of the housing 30 with respect to to the disk 11. The pilot or support rods 27 and 28 also provide the means for mounting a slotted caliper housing 30 for self-aligning movement with respect to the plane of the disk.

The caliper housing 30 has a transverse body portion 31 and a pair of spaced apart depending caliper arms or skirts 32 and 33 possibly shown best in FIG. 2. The caliper housing encircles only a peripheral portion of the brake disk at any one time extending only from the support rod 27 to support rod 28. At opposite ends, the yoke 30 is provided with pairs of axially spaced extensions such as 34, 35 and 36 which embrace at their ends, the ends of the rods 27 and 28. The extensions 34, 35, 36, etc., are removably secured on the ends of the rods 27 and 28 by any suitable means, such as the snap washers shown. The rods 27 and 28 freely pass through bores in the ends of the arms 25 and 26 so that the yoke 30 may shift axially for self-aligning movement on the support 23 in a direction parallel to the axis of the axle 21 while maintaining the caliper arms 32 and 33 at all times substantially parallel to the disk 11.

There is also provided separate torque-receiving means for mounting the brake pads on the arms 25 and 26 while confining the pads for translatory movement generally parallel to the axis of the axle 21 and while maintaining the braking elements with their surfaces generally parallel to the surfaces of the disk 11. For this purpose, each of the portions 25' and 26' are respectively formed with bores 41 and 42 which fixedly receive a further pair of rods or pins 43 and 44. The portions of the arms which receive the pair of rods 43 and 44 are somewhat reduced in axial dimension and are formed with a width in the axial direction which is slightly greater than the thickness of the disk 11. The rods 43 and 44 are each supported generally centrally of its length at a single location on the portions 25' and 26' radially centrally of the disk periphery, with the opposite unsupported ends of each of the rods extending to positions on either side of the disk 11 to receive brake plates thereon. As in the case of the first pair of rods 27 and 28, the rods 43 and 44 are aligned substantially parallel to each other and substantially parallel to the axis of the disk while being arcuately inwardly spaced in relation to the rods 27 and 28.

The braking elements comprise a pair of arcual backup or friction pad supporting plates 45 and 46, one on each side of the disk 11 within the housing 30. The plates 45 and 46 correspond, in outline, substantially to the outline of the caliper housing 30.

The plate 45 is provided with an extension 47 and the plate 46 is provided with an extension 48. These extensions are formed with holes through which the opposite ends of the rod 43 extend in a manner similar to that in which the rod 27 is received in the ends of the extensions 34 and 35. Similarly, the opposite ends of the brake plates 45 and 46 are each formed with an extension such as for example the extension 47 of the plate 45. The ends of the rod 44 are similarly received in a hole formed in the plate extensions 47. Thus the brake plates 45 and 46 and their respective extensions 47 and 48 are mounted for sliding movement on the free or unsupported ends of the rods 43 and 44, the movement being generally parallel to the axis of the axle 21. Conforming substantially in shape and size to the brake plates 45 and 46 are friction pads 49 and 50 which are preferably secured as bonding and/or rivets to the respective brake plates 45 and 46. The portions 25' and 26' form stops or abutments which limit the total possible movement of the plates 45 and 46 toward the disk with wear of the attached pads, and thus prevent damage to the disk surfaces.

The arms 25 and 26 at the extensions or portions 25' and 26' carry directly the torque from the brake lining plates 45 and 46 at locations radially outwardly of and axially centrally of the disk 11. None of this braking torque is applied to the housing 30, which is free to align itself on its support rods 27 and 28 free of the effects of the braking torque.

The employment of the portions 25' and 26' and the respective housing and brake plate supporting rods 27, 28 and 43, 44 eliminates the need for an additional torque member on the opposite side of the disk. The housing 30 is removable by the withdrawal of the rods 27 and 28, and the brake plates may then be removed by sliding off of the ends of the brake supporting rods 43 and 44. The lining plates are readily replaced in service merely by the removal of one of the pilot rods 27 or 28 and by swinging the housing 30 outwardly on the remaining rod, thereby exposing each of the plates for removal and replacement.

In FIG. 5 we have shown in greater detail the structure of one of the integral fluid force applying means for moving the braking elements into contact with the brake disk and the automatic retracting and wear take-up means. Referring especially to FIGS. 2 and 5, a hydraulic actuating mechanism 51 consisting of a fluid cylinder or cup unit 52 and a piston unit 53 is secured to the caliper arm 33 entirely within the caliper yoke 30 and in the space between the caliper arms 32 and 33. The cup and piston units form integral hydraulic force applying assemblies which are formed as parts separate from either the brake pads or plates, or the caliper housing.

The cup unit 52 reacts under hydraulic pressure on the plate 45. The piston unit 53 is positioned within the cup unit 52 with a portion extending through the open end of the cup and is guided for movement exclusively by the cooperating sliding surface of the cup and piston. It is provided with suitable sealing means such as for example the sealing ring 54. The piston unit 53 is removably secured directly to an inside surface of the caliper arm 33, is wholly within the yoke 30, and is positioned in the space between the caliper arm 33 and the adjacent brake plate 45. The reaction of the force of the fluid exerted is wholly on the inside of the caliper arm 33. Referring to FIG. 1, it may be seen that substantially the entire area of the piston (shown in dotted lines in FIG. 1) is backed by the skirt 33.

Any suitable retraction spring means may be employed. Thus the piston unit 53 may be annular in shape defining a bore 53' for receiving a combined retracting and wear take-up mechanism generally designated 55 and hereinafter further described. The piston 53 is secured to the caliper arm or skirt 33 exclusively by means of the fluid inlet fitting 56 and the bleed screw fitting 57. The fittings 56 and 57 may each be of substantially identical construction, except that the fitting 57 is provided with a suitable internal valve by means of which the unit 53 may be bled of any entrapped air. Thus, each of the fittings may include a threaded portion 58 received within suitable tapped openings within the piston 53. The fittings and piston 53 are retained in assembled position against the adjacent inside surface of the arm 33 by nuts 59 which are threadedly received on the outer extended ends of the fittings 56 and 57 and against the adjacent outer surface of the housing 30. In this manner, the fittings serve to retain the piston 53 in the assembled position on the inside surface of the arm 33. The piston 53 is provided with an inlet bore 60 communicating with the inlet fitting and with a bleed bore 61 communicating with the bleed fitting, with each of the bores opening into the interior of the cup unit 52 forward of the sealing ring 54.

Means may be provided for automatically regulating the retraction gap of the force applying or actuating mechanism 51, to assure the maintenance of a running clearance between the pads of lining material and the disk between brake applications. Such automatic retraction mechanism may be constructed according to the teachings of the patent to Dotto, No. 3,064,768, issued November 20, 1962, assigned to the same assignee as this application, wherein a secondary piston is received within a suitable bore formed within a primary piston and wherein the secondary piston has an area which is correlated with the friction coupling between it and the primary piston and further correlated with the force of the retraction spring so as to provide for automatic readjustment of reestablishment of a running clearance immediately upon the release of the brake. In FIG. 5, an example of the application of the teachings of the above patent to the present invention is shown as including a bolt 63 threaded into a boss in the cup unit 52 and extending into the axial bore 53' formed in the piston unit 53. Mounted on the bolt 63 is a secondary piston body 64 which is formed with an annular inclined ramp 65. A split ring 66 is mounted on the inclined ramp 65 and is biased into wedging relationship between the ramp 65 and the bore 53' by a pair of Belleville washers 68. The split ring 66 forms the frictional coupling between the cup unit 52 and the fixed unit 53.

Retraction spring means defining a retraction gap includes an additional pair of Belleville washers 69 and 70 mounted back-to-back on the secondary piston and received under a washer 71 carried under the head of the bolt 63. An external sealing ring 72 is received on the body 64 of the secondary piston for sealing the retraction unit to the bore. An internal O-ring 73 may also be provided for sealing the body 64 of the secondary piston on the shank of the bolt.

On the application of initial fluid pressure to the space between the cup and the piston units, the initial movement of the cup compresses the retraction springs 69 and 70 to take up the retraction gap identified at 74. Further movement of the cup unit 52 effects the movement of the entire secondary piston mechanism within the bore 53'. Retraction is effected by the retraction springs 69 and 70 to reestablish the running gap 74 upon the release of hydraulic pressure. Automatic readjustment is effected in accordance with the teachings of the above Dotto patent, wherein the secondary piston is formed with such an area that the fluid pressure maintains the retraction springs in their compressed condition during the initial portion of the release of the hydraulic or fluid pressure so that the brake parts can realign themselves. Upon the further decay of fluid pressure, the retraction springs then become effective to establish the running clearance.

The hydraulic force applying assembly of FIG. 5 may be effectively sealed from dust and other contaminations by a thin, flexible cup-shaped seal 75 anchored peripherally in a suitable groove formed in the back surface of the piston unit 53. The seal 75 has a forwardly extending skirt 76 surrounding and enclosing the inner end of piston unit 52.

In FIG. 6 we have shown a modification of the invention shown in FIGS. 2 and 5 as applied to the opposed piston type of caliper disk brake. This may be a fixed caliper brake of the general type disclosed and claimed in the copending application of William D. Walther and Carlos P. Afanador, Serial No. 335,519 filed January 31, 1964, and now abandoned, and assigned to the same assignee as this application. Therein similar parts have the same numerals with the addition of 100 as do corresponding parts in FIGS. 2 and 5. The skirts 132 and 133 of the caliper housing are axially spaced from the disk a distance to receive the force applying assemblies entirely within the axial space between the skirts and the disk.

A separate hydraulic actuating mechanism is received one on each side of the disk 11 within the skirts 131 and 132. Thus, in addition to the hydraulic actuating assembly 151 there is also provided a further hydraulic actuating assembly 181 corresponding to the actuating assembly 151 but having its piston secured to the skirt 132 in the same way that the actuating mechanism is secured to the caliper arm or skirt 133. This actuating mechanism 181 includes a cylinder 182, a piston 183, a combined retracting and take-up means 185, an inlet fitting 186, and a bleed screw fitting 187.

In FIG. 7 we have shown another alternative form of actuating mechanism. Therein similar parts to those shown in FIGS. 2 and 5 are designated by the same numerals with the addition of 200. There is shown the caliper yoke 230 having a center body 231 and caliper arms or skirts 232 and 233, a brake disk 211, a support ring 224, metal brake plates 245 and 246 and friction shoes 249 and 250. The actuating mechanism is designated 251 and is similar to that shown in FIGS. 2 and 5 except that the cylinder 252 is removably secured to the inside surface of the skirt 233 by inlet fitting 256 and bleed screw 257 with the open end thereof facing the disk. The piston 253 is slidably received within the cylinder cup and projects therefrom with an exposed outer end bearing against the metal braking element 245.

In the structures shown in FIGS. 2, 5, 6 and 7 one unit of the fluid actuating mechanism exerts force on the associated braking element to urge it into contact with the brake disk. The reaction thrust of the fluid mechanism acts on the inside of the associated caliper arm or skirt. Thus there is no excessive force being at any time transmitted to the inlet fittings 56, 156 and 256 or the bleed screws 57, 157 and 257 which in view of the absence of excessive strain may also serve as retainers or bolts for securing the hydraulic mechanism on the caliper arms or skirts.

The brake actuating assemblies 251 may be duplicated on opposite sides of the caliper yoke 230 and 330 in the same way that the assembly 51 of FIGS. 2 and 5 is duplicated in FIG. 6 as assemblies 151 and 181.

*Operation*

The brake disk 11 continuosuly turns with the wheel parts 12, 13, and 14 while the caliper yoke 30 is held from turning the torque member 23. When fluid pressure is applied to the actuating mechanism 51 through the inlet fitting 56, it separates the piston unit 53 and the cylinder unit 52 and thus moves the metal brake plate 45 and friction pad 49 away from the caliper arm 33. The reaction of the caliper arm 33 is also transmitted to the caliper arm 32 and thus while the metal plate 45 and its friction material 49 is being moved from one side towards the rotating brake disk 11, the metal plate 46 and its friction material 50 is being moved from the other side towards the disk 11. This concurrently moves both the friction pads 49 and 50 into contact with the disk 11 and supplies braking force through the disk 11 to the wheel. Reaction of the hydraulic actuating force is as stated through the piston 53 to the inside of the caliper arm 33.

The operation of the automatic retracting mechanisms has been previously described. They provide the retraction means within the force applying units for effecting retraction and establishing a running clearance.

It will be seen that the force applying units described consist of assemblies which can easily be removed from the caliper housing 30 and replaced or repaired as necessary. They substantially reduce the cost of the brake by confining the precision machining operations to members which are readily adapted for mass production techniques and easily replaced. The cylinder bore is thus eliminated from the housing or yoke 30 and is confined to parts which are considerably more economical to produce. The arrangement of the force applying units within the arms of the yoke eliminate the need for any attachment which is required to carry the reaction force of the unit. Thus, the arrangement is such that the units may be inspected and repaired, as necessary, at the time that the lining is inspected and/or replaced, without the necessity of performing any refinishing operations upon the caliper housing.

It will be understood that the teachings of this invention, as they relate to force applying mechanism, may be applied generally to caliper type disk brakes. However, the force applying mechanism is particularly adapted to use with the brake structure disclosed herein and with the brake of the type disclosed in the above Dotto et al. Patent No. 3,081,843, wherein no torque is transmitted from the braking elements to the force applying elements mounted in the caliper housing. Thus, in attaching the hydraulic actuating mechanism to the housing 30 no special provision need be made relative to the transmission of torque. Therefore, such connections may conveniently be effected by the hydraulic fittings, themselves, there being no torque transmitted through the hydraulic mechanism to the caliper housing.

The torque from the brake plates 47 and 48 is transmitted directly to the pins 43 and 44 and to the torque arms 25 and 26. As the pads 49 and 50 wear, the associated plates move axially toward the disk 11 and accordingly move inwardly on the pins 43 and 44. Therefore, the moment arm of the plates on the pins becomes less and the rigidity and strength of plate support increases with wear of the pads. The portions 25' and 26' serve to prevent damaging contact of the plates against the disk following substantial wear of the associated lined pads 49 and 59 by limiting the movement of the plates toward the disk.

It should be further understood that two pairs of rods, consisting of the rods 27, 28 and 43, 44 are not necessary. The rods 43 and 44 are provided as a convenience for mounting the housing 30 independently of the linings so that they may be removed without further disassembly of the brake. One pair of rods would be sufficient for the purpose of mounting both the brake pads 47 and 48 and the housing 30 to maintain separate torque absorbing means for the lining and for providing axial movement of the caliper housing. However, this arrangement would require that the caliper be disassembled from the rods prior to removing the worn lining material.

While the forms of apparatus herein described constitute preferred embodiments of our invention, it is to be understood that the invention is not limited to the precise forms of apparatus, and that changes may be made therein without departing from the scope of the invention which is defined in the following claims.

What is claimed is:

1. A caliper type disk brake for a vehicle wheel comprising:

a brake disk fixed for rotation with the wheel in a plane generally perpendicular to the axis of said wheel;

a support fixed with respect to the vehicle and including a pair of spaced support arms each extending generally radially outward from the axis of said wheel;

a pair of braking elements each supported adjacent said brake disk and with their surfaces in planes substantially parallel to the surfaces of said disk and being positioned on opposite sides of said disk and each comprising a backing plate and a friction pad associated with said plate, and being movable into contact with said brake disk;

a caliper housing supported adjacent and having portions on opposite sides of said pair of braking elements;

fluid force applying means associated with said caliper housing, for moving said pair of braking elements into contact with said brake disk;

means comprising a first pair of rods, one of which is supported by each of said support arms at a single location radially centrally of said disk and outwardly of the periphery thereof leaving the opposite ends of said rods unsupported with the longitudinal axis of each of said rods being substantially parallel to the axis of said disk;

means on said braking elements movably supporting said braking elements on said first pair of rods confining their movement to straight line translatory movement generally parallel to the axis of said disk and for maintaining the surfaces of said braking elements substantially parallel to the plane of the surfaces of said disk;

means comprising a second pair of rods, one of which is also supported by each of said arms at a single location radially centrally of said disk and outwardly of the periphery thereof leaving the opposite ends of said second pair of rods unsupported with the longitudinal axis thereof being substantially parallel to each other and substantially parallel to the axis of said disk; and means movably supporting said caliper housing on said second pair of rods and for confining its movement to straight line translatory movement parallel to the axis of said disk.

2. The brake of claim 1 in which said first pair of rods is fixed at said single location on said arms.

3. The brake of claim 1 in which said first and second pairs of rods are fixed at their respective said single locations in said arms.

4. The brake of claim 1 in which said fluid force applying means includes a cylinder cup received in the axial space between one of said caliper housing portions and the adjacent said backing plate, and a piston slidably received in said cup and guided for movement exclusively by cooperating sliding surfaces of said cup and piston, and means mounting said force applying means on said caliper housing portion free of any torque transmitting connection with the adjacent pad of friction material.

5. The brake of claim 4 in which said fluid force applying mounting means comprises hydraulic connections in said caliper housing forming the exclusive support therefor.

References Cited by the Examiner
UNITED STATES PATENTS

| | | | |
|---|---|---|---|
| 2,711,802 | 6/1955 | Davis | 188—152 |
| 2,799,367 | 7/1957 | Dotto | 188—73 |
| 2,955,681 | 10/1960 | Burnett | 188—106 |
| 2,966,964 | 1/1961 | Brueder | 188—152 |
| 2,968,370 | 1/1961 | Ruet | 188—73 |
| 3,081,843 | 3/1963 | Dotto et al. | 188—73 |

MILTON BUCHLER, *Primary Examiner.*

G. E. A. HALVOSA, *Assistant Examiner.*